United States Patent [19]

Boslough et al.

[11] Patent Number: 5,420,894
[45] Date of Patent: May 30, 1995

[54] ELASTIC STORAGE CIRCUIT

[75] Inventors: James W. Boslough, Phoenix; David C. Saar, Glendale; George K. Tarleton, Phoenix, all of Ariz.

[73] Assignee: AG Communication Systems Corporation, Phoenix, Ariz.

[21] Appl. No.: 171,317

[22] Filed: Dec. 21, 1993

[51] Int. Cl.⁶ .................................................. H04L 7/00
[52] U.S. Cl. ................................. 375/372; 370/105.3
[58] Field of Search ............................. 375/113, 118; 370/105.1, 105.3, 102, 108; 365/49

[56] References Cited

U.S. PATENT DOCUMENTS

| | | | |
|---|---|---|---|
| 4,158,107 | 7/1979 | Nicholas | 370/105.1 |
| 4,439,786 | 3/1984 | Claydon et al. | 375/118 |
| 4,569,063 | 2/1986 | Perry | 375/119 |
| 4,891,788 | 1/1990 | Kreifels | 375/118 |
| 5,323,426 | 6/1994 | James et al. | 370/102 |
| 5,331,639 | 7/1994 | Takatori et al. | 375/118 |

Primary Examiner—Stephen Chin
Assistant Examiner—William A. Luther
Attorney, Agent, or Firm—Gregory G. Hendricks

[57] ABSTRACT

A circuit which synchronizes the phase of a data stream from a transmitting system, to the phase of the clock signal of the receiving system. Two frames of data from the transmitting data stream are stored in a memory which is continuously updated as the data for each time slot is stored in a different word of memory. The storage of the incoming stream data is controlled by the clock signal from the transmitting system. The data stored in the memory is then read out of that memory under control of the clock signal from the receiving system. As each word is read out, it is reinserted into the bit stream that is transmitted to the receiving system. An address control circuit ensures that write addresses have priority over read addresses. Similarly, a read/write control circuit ensures that write signals have priority over read signals. The read signals are arranged such that two read signals are available for each time slot. If there is a conflict between a write signal and the first read signal in a particular time slot, that read signal is inhibited and the second read signal in that time slot will retrieve the data from the memory for insertion in the data stream to be transmitted to the receiving system. If there is no conflict between a write signal and the first read signal, then the first read signal will retrieve the data from memory for insertion in the data stream to be transmitted to the receiving system and the second read signal is inhibited.

8 Claims, 1 Drawing Sheet

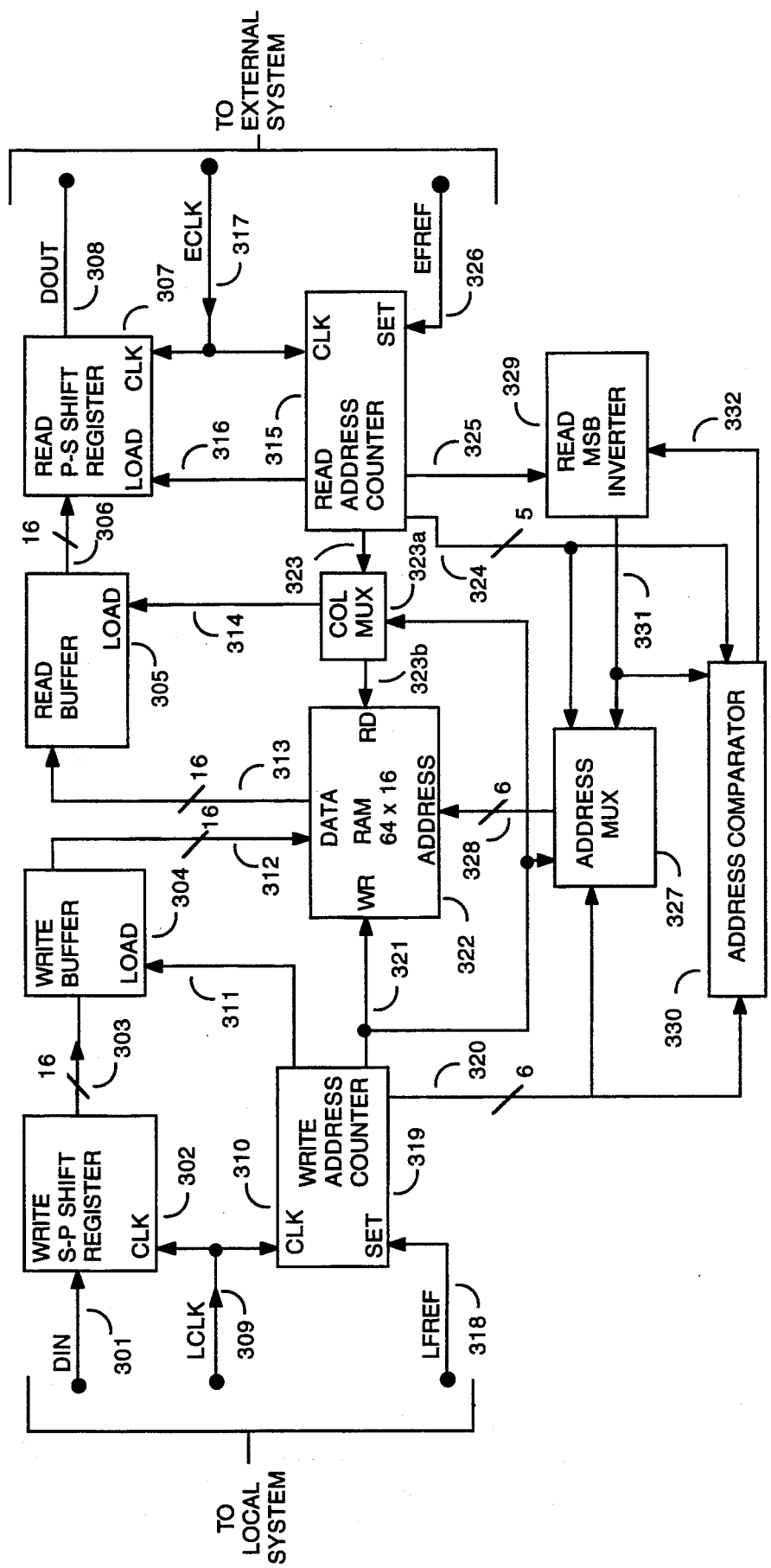

ELASTIC STORAGE CIRCUIT

FIELD OF THE INVENTION

The present invention relates to pulse code modulation circuitry, and more particularly to a circuit for compensation of phase differences in the clock and framing signals of two systems between which pulse code modulation or other time division multiplex data (TDM) is transmitted.

BACKGROUND OF THE INVENTION

Whenever data is to be transmitted from one system to another, even if those systems operate at the same frequency, the phase of such signals must be synchronized. Typically, a phase locked loop circuit is used to synchronize the phase of those signals. An example of a phase locking arrangement is disclosed in U.S. Pat. No. 4,569,063, "A Digital Phase Locking Arrangement For Synchronizing Digital Span Data". Other related inventions are disclosed in U.S. Pat. Nos. 4,531,210, "A Digital Span Reframing Circuit"; and 4,598,268, "A Digital Span Conversion Circuit". However, it is the object of the present invention to provide a novel digital arrangement for synchronizing the phase of the clock and frame signals of two different systems between which TDM data is transmitted.

SUMMARY OF THE INVENTION

The present invention is a novel arrangement of a elastic storage circuit for use in a telephone system having a transmitting system utilizing a first clock signal of predetermined frequency and phase of a first characteristic, and a receiving system utilizing a second clock signal of the same predetermined frequency and phase of a second characteristic. The transmitting system is operated to transmit TDM data at the predetermined frequency and the phase of a first characteristic. The TDM data is arranged in frames, each having a predetermined number of time slots, and each time slot having a predetermined number of bits. The receiving system is operated to receive the TDM data at the predetermined frequency and phase of a second characteristic.

The elastic storage circuit includes a first storage control circuit connected to the transmitting system and operated in response to the first clock signal to receive the TDM data and generate a write signal, a specific write address signal, and buffered TDM data signals corresponding to the TDM data collected during each time slot.

Also included is a storage circuit connected to the first storage control circuit and operated in response to the write signals and the write address signals to store a predetermined number of frames of the buffered TDM data, and to store buffered TDM data associated with each time slot of subsequent frames, in the same storage location as the corresponding frame and time slot of the predetermined number of frames.

In addition, a second storage control circuit is connected between the storage circuit and the receiving system and operated in response to the second clock signal to generate a read signal, and a specific read address signal associated with each time slot of the first predetermined number of frames.

The storage circuit is further operated in response to the read signals and the read address signals to retrieve the buffered TDM data and generate corresponding stored TDM data.

The second storage control circuit is further operated to transmit the stored TDM data to the receiving system in the same sequence as the buffered TDM data was stored in the storage circuit.

DESCRIPTION OF THE DRAWINGS

The single figure of the accompanying drawing is a block diagram of a elastic storage circuit in accordance with the present invention.

DESCRIPTION OF THE PREFERRED EMBODIMENT

Referring now to the accompanying drawing the elastic storage circuit of the present invention is shown. The present invention is designed to accommodate the transfer of TDM signals organized around a frame of information having 32 time slots, each of which includes 16 bits of information. The clock signals typically have a frequency of 4096 K Hz.

The serial TDM data-in DIN signals on lead 301 are clocked into the Write Serial to Parallel (S-P) 16-Bit Shift Register 302 by the local clock LCLK signal on lead (309). The 16-Bit wide output signals from this register on leads 303 are loaded into the 16-Bit Write Buffer 304 once each time slot when clocked by a load signal on lead 311. The 16-Bit wide output signals from the Write Buffer 304 on leads 312 are then written into the 64 X 16-Bit RAM 322 once per time slot.

This TDM data is written into the RAM with time slot 0 data written in address 0, time slot 1 data written in address 1, and etc. through time slot 31 data which is written into address 31. Then time slot 0 data of the next frame is written in address 32 and etc. through time slot 31 data of this next frame which is written into address 63 of the RAM 322. Then time slot 0 data of the next following frame is written into address 0, time slot 1 data of this next following frame is written into address 1 and etc. Thus, a 64 word, 16 bit/word, memory is used to store two frames of TDM data with each frame containing 32 time slots of 16 bits each.

This process continues without interruption under control of the 10-Bit Write Address Counter 319, which is clocked by the Local Clock (LCLK) signal on lead 309 and is synchronized for proper framing by the Local Frame Reference (LFREF) signal on lead 318. The 6 Most Significant Bits (MSB) of the Write Address Counter (319) on leads 320 are applied to Address MUX 327 and to Address Comparator 330. The RAM 322 address bus 328 is 6-Bits wide. The Write signal appears on lead 321 which is connected to Address MUX 327 and Read/Write Collision MUX 323a.

Read Address Counter 315 controls the RAM 322 read function. The 10-Bit Read Address Counter (315) is clocked by the External Clock (ECLK) signal on lead 317. The Read Address Counter 315 is synchronized for proper framing on the transmit data out by the External Frame Reference signal (EFREF) on lead 326. The TDM data from address 0 is placed in time slot 0, the TDM data from address 1 is placed in time slot 1 and etc. through address 31 whose data is placed in time slot 31. Then address 32 data is placed in time slot 0, address 33 data is placed in time slot 1 and etc. of the next frame through address 63, whose data is placed in time slot 31 of this second frame. Then address 0 data is placed in time slot 0 of the next following frame and etc. to provide a continuous flow of the Read TDM data.

The Most Significant Bit (MSB) on lead 325 out of Read Address Counter 315 goes to Read MSB Inverter 329. The MSB out of Read MSB inverter 329 on lead 331 goes to Address MUX 327 and Address Comparator 330. The next 5 most significant bits out of Read Address Counter 315 on leads 324 go directly to Address MUX 327 and to Address Comparator 330. The Read signal on lead 323 is applied to Read/Write Collision MUX 323a and the Gated Read signal out of Read/Write Collision MUX 323a appears on leads 323b and 314. The Gated Read signal on these leads is then applied to RAM 322 and to Read Buffer 305.

If the Write Address signal on leads 320 and the Read Address signals on leads 324 are closer than 1 time slot, the signal on output 332 of Address Comparator 330 will cause MSB Inverter 329 to invert the MSB signal on lead 325 and apply an Inverted MSB signal to Address MUX 327 and Address Comparator 330 via lead 331. This Inverted MSB signal will switch the Read Address signals on leads 324 to the other half of RAM 322. If the Write Address signals on leads 320 are more than 34 time slots ahead of the Read Address signals on leads 324, the output signal on lead 332 from Address Comparator 330 will again cause the MSB Inverter 329 to invert the MSB signal on lead 325 and output that inverted signal on lead 331, thereby switching the read function back into the half of RAM 322 which is closer to the Write Address signals on leads 320.

The Read signal appearing on lead 323 is gated through Read/Write Collision MUX 323a and appears at RAM 322 on lead 323b. This Read signal is gated through the Collision MUX 323a in such a way as to ensure that there is no conflict between the Write signal from Write Address Counter 319 and the Read signal from Read Address Counter 315. Collision MUX 323a operates to ensure that there is no such conflict or overlap in these signals. If a Read signal appears on lead 323 at any time during the appearance of a Write signal on lead 321, the Read signal is not gated through Collision MUX 323a, thereby ensuring that only the Write signal has access to RAM 322. In the event that the Read signal appears at Collision MUX 323a when there is no Write signal on lead 321, Collision MUX 323a gates the Read signal to RAM 322 via lead 323b. Thus, there is no conflict between the Read and Write signals to access RAM 322 since the Write signal inhibits the Read signal via Collision MUX 323a and the Read signal is only applied to RAM 322 if there is no conflict between it and the Write signal.

The capability of ensuring that a Read signal does occur within each time slot, but does not conflict with a Write signal, results from the arrangement of the present invention, which provides two Read signals during each time slot. The interval between the two Read signals is greater than the duration of the Write signal. In the event that there is a conflict between the Write signal and one Read signal, the other Read signal becomes or was the active Read signal. When there is no Write signal versus Read signal conflict, then the first Read signal is used and the second Read signal is inhibited.

The 16-Bit wide TDM data on leads 313 out of RAM 322 are latched into 16 bit Read Buffer 305 once each time slot. The 16-Bit wide TDM data on leads 306 out of Read Buffer 305 are loaded into the 16 bit Read Parallel to Serial (P-S) Shift Register 307 under control of Read Address Counter 315. The TDM data in Read P-S Shift Register 307 is then clocked out as DOUT signals on lead 308, bit by bit, i.e., serial data out.

The Elastic Storage Circuit is designed to allow local clock signal LCLK on lead 309 and external clock signal ECLK on lead 317 to be identical in frequency but different in their phase relationship. The two frame reference signals, local frame reference signal LFREF on lead 318 and external frame reference signal EFREF on lead 326, are identical in frequency but they also can have a different phase relationship.

The Elastic Storage Circuit's capability to handle the difference in the phase relationships of the two clocks and the difference in the phase relationships of the two frame reference signals is its true elasticity capability. This elasticity capability is possible because of the unique capability of the Read section, of the present invention, to read the TDM data out of the RAM 322 at two different times within each time slot, i.e., two read pulses are output by READ ADDRESS COUNTER 315 during each time slot. This capability to read from the memory at two different times within one time slot is necessary because the writing of TDM data into the memory can occur at anytime during the read cycle and such writing into memory always has priority for use of the memory. The length of the write-to-memory cycle is shorter than the time between the two read cycles within that time slot, so there can be no overlap of the write cycle with both read cycles. This double read capability guarantees that there will be a continual flow of the Read TDM data without gaps or repeats, i.e., the Read TDM data will always have the correct time slot's data in the correct time slot.

A similar circuit would be used to receive TDM data from the external system and "transmit" it to the local system. In such an arrangement, the connections to the local and external systems shown in FIG. 1, would be reversed.

Thus, the Elastic Storage Circuit of the present invention provides a novel arrangement for synchronizing two data streams.

It will be obvious to those skilled in the art that numerous modifications of the present invention can be made without departing from the spirit of the invention which shall be limited only by the scope of the claims appended hereto.

What is claimed is:

1. A phase synchronization circuit for use in a telephone system having a transmitting system utilizing a first clock signal of predetermined frequency and a phase of a first characteristic, and a receiving system utilizing a second clock signal of said predetermined frequency and a phase of a second characteristic, said transmitting system being operated to transmit time division multiplex (TDM) data at said predetermined frequency and said phase of a first characteristic, said TDM data being arranged in frames, each having a predetermined number of time slots, and each time slot having a predetermined number of bits, said receiving system being operated to receive said TDM data at said predetermined frequency and said phase of a second characteristic, said phase synchronization circuit comprising:

first storage control means connected to said transmitting system and operated in response to said first clock signal to receive said TDM data and generate a write signal, a specific write address signal, and buffered TDM data signals, corresponding to the TDM data received during each time slot;

storage means connected to said first storage control means and operated in response to said write signals and said write address signals to store a predetermined number of frames of said buffered TDM data, and to store buffered TDM data associated with each time slot of subsequent frames in the same storage location as the corresponding frame and time slot of the first predetermined number of frames;

second storage control means connected between said storage means and said receiving system and operated in response to said second clock signal to generate a read signal and a specific read address signal associated with each time slot of said first predetermined number of frames, and the corresponding time slot of subsequent frames;

said storage means further operated in response to said read signals and said read address signals to retrieve said buffered TDM data as stored in said storage means, and generate corresponding stored TDM data;

said second storage control means further operated to transmit said stored TDM data to said receiving system in the same sequence as said buffered TDM data was stored in said storage means;

address selection means connected to said first storage control means, said second storage control means and said storage means, and operated in response to said read and write address signals to-ensure that they represent addresses separated by a predetermined range of storage means address locations, said address selection means comprising:

an address comparator connected to said first and second storage control means and operated in response to said read and write address signals representing addresses having a difference of more than a minimal amount and less than a maximum amount, to generate a gating signal, and operated in response to said difference being less than said minimal amount and more than said maximum amount, to generate an inversion signal;

inversion means operated in response to said gating signal and said read address signals to generate gated read address signals, and further operated in response to said inversion signal and said read address signals to invert the most significant bit of said read address signals and gate the other read address signals, thereby providing inverted read address signals; and multiplexing means operated in response to said write address signals, said gated read address signals, and said inverted read address signals, to apply said signals to said storage means.

2. A phase synchronization circuit as claimed in claim 1, wherein said TDM data is transmitted in serial format, said first storage control means comprising:

a serial to parallel shift register operated to convert said serial TDM data to parallel TDM data;

a buffer operated to store said parallel TDM data; and a counter operated in response to said first clock signal to generate said write and said write address signals.

3. A phase synchronization circuit as claimed in claim 1, wherein said second storage control means comprises:

a counter operated in response to said second clock signal to generate said read and said read address signals;

a buffer operated to receive said stored TDM data and generate retrieved TDM data; and a parallel to serial shift register operated to receive said retrieved TDM data and serially transmit it to said recovery system.

4. A phase synchronization circuit as claimed in claim 1, whereas said storage means comprises a random access memory.

5. A phase synchronization circuit for use in a telephone system having a transmitting system utilizing a first clock signal of predetermined frequency and a phase of a first characteristic, and a receiving system utilizing a second clock signal of said predetermined frequency and a phase of a second characteristic, said transmitting system being operated to transmit time division multiplex (TDM) data at said predetermined frequency and said phase of a first characteristic, said TDM data being arranged in frames, each having a predetermined number of time slots, and each time slot having a predetermined number of bits, said receiving system being operated to receive said TDM data at said predetermined frequency and said phase of a second characteristic, said phase synchronization circuit comprising:

first storage control means connected to said transmitting system and operated in response to said first clock signal to receive said TDM data and generate a write signal, a specific write address signal, and buffered TDM data signals, corresponding to the TDM data received during each time slot;

storage means connected to said first storage control means and operated in response to said write signals and said write address signals to store a predetermined number of frames of said buffered TDM data, and to store buffered TDM data associated with each time slot of subsequent frames in the same storage location as the corresponding frame and time slot of the first predetermined number of frames;

second storage control means connected between said storage means and said receiving system and operated in response to said second clock signal to generate a read signal and a specific read address signal associated with each time slot of said first predetermined number of frames, and the corresponding time slot of subsequent frames;

said storage means further operated in response to said read signals and said read address signals to retrieve said buffered TDM data as stored in said storage means, and generate corresponding stored TDM data;

said second storage control means further operated to transmit said stored TDM data to said receiving system in the same sequence as said buffered TDM data was stored in said storage means;

access selection means connected to said first storage control means, said second storage control means and said storage means, and operated in response to said read and write signals to ensure that they are separated by a predetermined amount of time;

said second storage control means further providing first and second read signals associated with each time slot and said access selection means comprising:

gating means operated in response to said first read signal and said write signal being separated by less than a predetermined amount of time to inhibit said first read signal and apply said second read signal to said storage means, and further operated in response to said first read signal and said write signal being separated by more than a predetermined amount of time to inhibit said second read signal and apply said first read signal to said storage means.

6. A phase synchronization circuit as claimed in claim 5, wherein said TDM data is transmitted in serial format, said first storage control means comprising:
- a serial to parallel shift register operated to convert said serial TDM data to parallel TDM data;
- a buffer operated to store said parallel TDM data; and
- a counter operated in response to said first clock signal to generate said write and said write address signals.

7. A phase synchronization circuit as claimed in claim 5, wherein said second storage control means comprises:
- a counter operated in response to said second clock signal to generate said read and said read address signals;
- a buffer operated to receive said stored TDM data and generate retrieved TDM data; and
- a parallel to serial shift register operated to receive said retrieved TDM data and serially transmit it to said recovery system.

8. A phase synchronization circuit as claimed in claim 5, whereas said storage means comprises a random access memory.

* * * * *